United States Patent [19]

Fette et al.

[11] Patent Number: 4,862,407
[45] Date of Patent: Aug. 29, 1989

[54] DIGITAL SIGNAL PROCESSING APPARATUS

[75] Inventors: Bruce A. Fette, Mesa; Leslie K. Lewis, Scottsdale; Marc L. Briel, Tempe; Thomas J. Makovicka, Mesa, all of Ariz.

[73] Assignee: Motorola, Inc., Schaumburg, Ill.

[21] Appl. No.: 104,479

[22] Filed: Oct. 5, 1987

[51] Int. Cl.[4] ............................................. G06F 13/00
[52] U.S. Cl. .............................. 364/900; 364/931.49; 364/965.9
[58] Field of Search ... 364/200 MS File, 900 MS File, 364/748

[56] References Cited

U.S. PATENT DOCUMENTS

| | | | |
|---|---|---|---|
| 4,075,704 | 2/1978 | O'Leary | 364/200 X |
| 4,488,252 | 12/1984 | Vassar | 364/748 |
| 4,547,849 | 10/1985 | Louie et al. | 364/200 |
| 4,561,065 | 12/1985 | Matsuda | 364/724 |
| 4,641,238 | 2/1987 | Kneib | 364/200 |
| 4,665,538 | 5/1987 | Machida | 364/215 |

OTHER PUBLICATIONS

Gosch, J., "Philips to Offer Signal Processor", Electronics Magazine, Apr. 7, 1986, pp. 17-20.
"Motorola's Sizzling New Signal Processor", Electronics Magazine, Mar. 10, 1986, pp. 30-33.
Fair et al., "CMOS DSP Components Target New Military Applications", Defense Electronics, Apr. 1986, pp. 105-116.
"Analog Devices to Sell 1-Chip Signal Processor", Electronics Magazine, Feb. 24, 1986, p. 89.

Primary Examiner—Thomas M. Heckler
Attorney, Agent, or Firm—Frank J. Bogacz

[57] ABSTRACT

A digital signal processing apparatus having a host processor interfaced to a plurality of signal processing coprocessors through dual port memory elements is disclosed. Coprocessors represent microcoded machines wherein low level instructions directed toward the mechanics of performing a specific signal processing algorithm are contained in microcode. Thus, the host processor programs coprocessors using higher level functional instructions. Each of the coprocessors has a multiply-accumulator, a barrel shifter, an address generator, a hardware loop counter, and a microsequencer.

15 Claims, 3 Drawing Sheets

DIGITAL SIGNAL PROCESSING APPARATUS

BACKGROUND OF THE INVENTION

This invention generally relates to digital signal processing systems. Specifically, the present invention relates to digital signal processors which efficiently perform linear predictive coding (LPC) algorithms. More specifically, the present invention relates to digital signal processors which have general purpose processing capabilities. With general purpose processing capabilities, the present invention can perform a wide variety of digital signal processing algorithms and can expand to accommodate a wide range of processing capability.

Prior art digital signal processing (DSP) systems fail to effectively integrate all portions of the DSP system to achieve a high level of computational performance with minimum parts and minimum power consumption. For example, a multiply-accumulate operation represents an essential, frequently utilized function within most DSP systems. By increasing the speed of this frequently utilized operation, overall DSP system throughput may increase. However, some DSP systems utilize fast multiply-accumulate operations but waste speed advantages by failing to supply data to the devices which perform the multiply-accumulate operations in an efficient manner.

Additionally, conventional DSP systems may transfer data from a random access memory (RAM) to a device which performs a multiply-accumulate operation. System speed may be increased by utilizing RAM memory having fast data access times. However, some DSP systems tend to waste such speed advantages by requiring an excessive amount of time for stabilization of address inputs to such RAM memories.

Further, some DSP systems quickly handle data arrays in terms of mathematical computations, but tend to waste such speed advantages through the use of an architecture that requires an excessive amount of time to set up and fetch the data arrays. Accordingly, in such DSP systems the mathematical computations are suspended while data arrays are being constructed and moved.

Still further, many DSP systems require sequential processing of various signal processing tasks. However, in many digital signal processing applications one set of tasks may be found which does not require output from another set of tasks. Thus, the one set of tasks can be undertaken in parallel with the other set of tasks. Failure to take advantage of parallel processing opportunities tends to degrade throughput results.

Additionally, various computationally efficient DSP systems exist which are dedicated to performing a narrow set of signal processing functions. Such systems require an undesirably large quantity of parts when adapted to perform a wide variety of signal processing functions. Consequently, poor reliability and increased power consumption results.

Still further, some DSP systems require development of an undesirably large and complex body of software in order to use the DSP system. As a result, such systems are difficult to use, require a relatively large design time, and lead to products which have an increased likelihood of unreliable operation due to the existence of difficult to detect software errors.

SUMMARY OF THE INVENTION

Accordingly, it is an object of the present invention to provide an improved digital signal processing design which integrates many digital signal processing functions together in a balanced approach toward achieving overall computational efficiency.

Another object of the present invention concerns providing a general purpose digital signal processor which is capable of performing a wide variety of digital signal processing tasks or algorithms efficiently.

Yet another object of the present invention concerns providing a computationally efficient DSP apparatus for LPC encoding and decoding.

Still another object of the present invention concerns providing a DSP apparatus which utilizes more than one digital signal compressor for basic DSP algorithms. The use of more than one coprocessor permits the present invention to take advantage of parallel processing opportunities.

Yet another object of the present invention concerns providing a DSP apparatus which minimizes hardware requirements so that an entire coprocessor resides on no more than two interconnected integrated circuits.

The above and other objects and advantages of the present invention are carried out in one form by an apparatus having a host processor with a data bus and an address bus. A first port of one dual port memory resides on the host processor data and address bus. Likewise, a first port of another dual port memory resides on the host processor data and address bus. A first coprocessor has its own data and address bus which couple to a second port of the first dual port memory. Additionally, a second coprocessor has its own data and address bus which couple to the second port of the second dual port memory.

BRIEF DESCRIPTION OF THE DRAWINGS

A more complete understanding of the present invention may be derived by referring to the detailed description and claims when considered in connection with the accompanying drawings, wherein like reference numbers throughout the drawings indicate similar features, and wherein:

DETAILED DESCRIPTION OF THE PREFERRED EMBODIMENT

Figure 1:
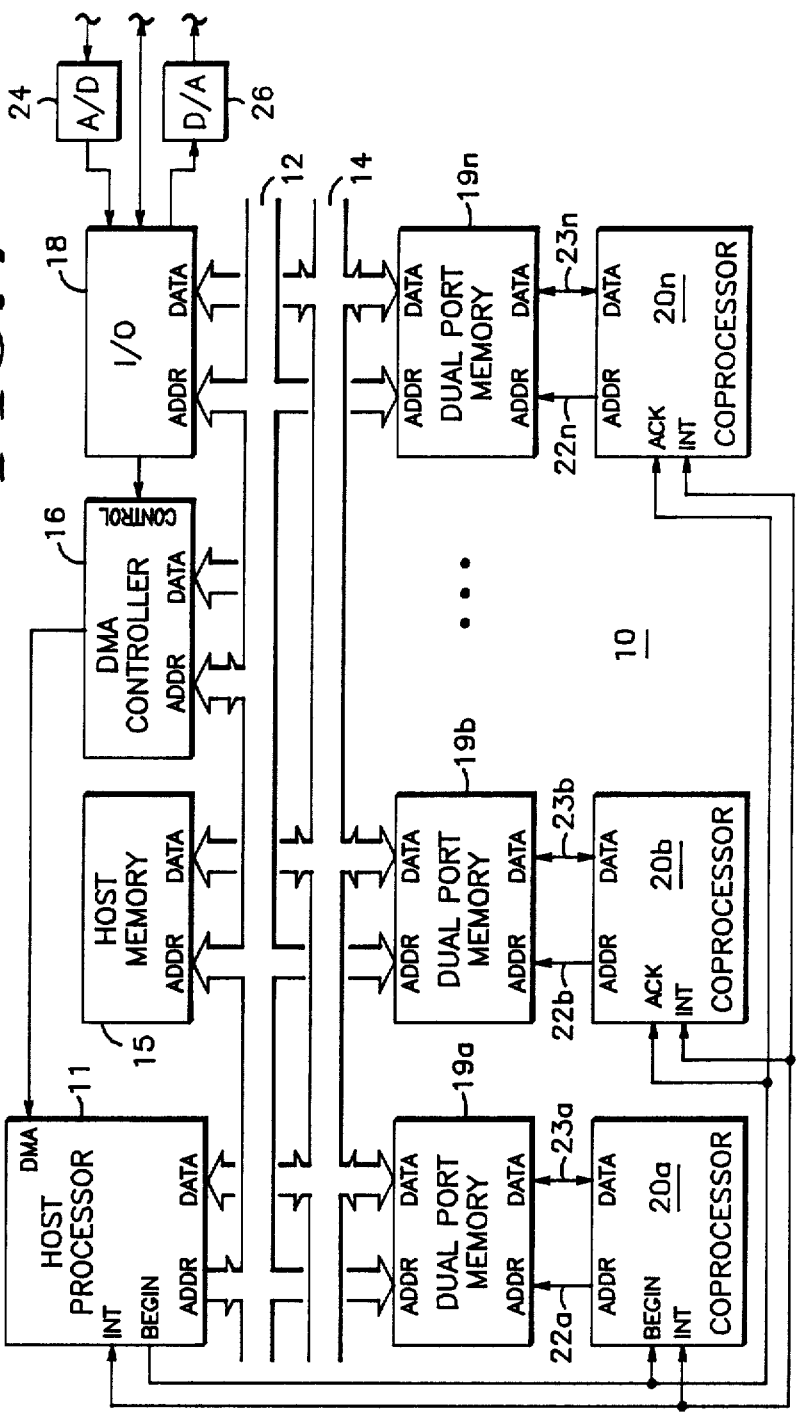
FIG. 1 shows a simplified block diagram of a digital signal processing apparatus.

FIG. 1 shows a simplified block diagram of the digital signal processing (DSP) apparatus 10. The preferred embodiment of the present invention utilizes DSP 10 as a vocoder which receives digitized voice in real time and uses Linear Predictive Coding standard LPC 10152E to compress the digitized voice so that it exhibits a 2400 bits per second rate. Simultaneously, DSP 10 receives 2400 bits per second data and decodes it using LPC 10152E into 180 voice samples every 22.5 ms.

DSP 10 includes a host processor 11 having an address bus 12 and a data bus 14 associated therewith. In the preferred embodiment, host processor 11 represents a Motorola MC68000 16-bit microprocessor along with associated support circuitry. Data bus 14 represents an input/output bus which serves the purpose of transferring data into and out from all devices, including host processor 11, which are coupled to data bus 14.

A plurality of dual port memory elements 19 each have first ports which couple to host processor address bus 12 and host processor data bus 14. Thus, a dual port memory element 19a has a first address interface which couples to address bus 12 and a first data interface which couples to data bus 14. Likewise, a dual port memory element 19b has an address interface which couples to address bus 12 and a data interface which couples to data bus 14. Furthermore, a dual port memory element 19n has an address interface which couples to address bus 12 and a data interface which couples to data bus 14.

A coprocessor 20a has its own address and data buses which couple to a second port of dual port memory element 19a, a coprocessor 20b has its own address and data buses which couple to a second port of dual port memory element 19b, and a coprocessor 20n has its own address and data buses which couple to a second port of dual port memory element 19n. Specifically, data address busses 22a-22n of coprocessors 20a-20n couple to second address interfaces of dual port memory elements 19a-19n, respectively. Further, data busses 23a-23n of coprocessors 20a-20n couple to second data interfaces of dual port memory elements 19a-19n, respectively.

In the preferred embodiment, dual port memory elements 19 represent devices which contain separate sense amplifiers so that simultaneous read and/or write operations may be performed on a dual port memory element 19 from the first and second ports thereof. An IDT 7132 device manufactured by Integrated Devices Technology represents one example of such a dual port memory element. With such a dual port memory element, a coprocessor 20 need not experience a delay in communicating with a corresponding dual port memory element 19, and host processor 11 need not experience a delay in communicating with dual port memory 19. In the preferred embodiment, dual port memory element 19 exhibits approximately a 100 ns access cycle.

Host processor 11 communicates indirectly with coprocessors 20 through dual port memory elements 19. Additionally, host processor 11 communicates directly with coprocessors 20 through a communications channel which includes a set of interrupt signals and a set of begin signals. The set of interrupt signals includes unique interrupt outputs from each of coprocessors 20 which are input to host processor 11 and unique interrupt acknowledge signals output from host processor 11 and input to each of coprocessors 20. Additionally, the begin set of signals represents output bits which are controllable from software written for host processor 11. These begin signals may be set by writing to predetermined address locations within an address space of host processor 11. The begin signals originate at host processor 11 and are input to each of coprocessors 20.

Additionally, a host memory 15 has an address interface which couples to host processor address bus 12 and a data interface which couples to host processor data bus 14. In the preferred embodiment, host memory 15 contains approximately 8K of RAM memory and 8K of ROM memory. A DMA controller 16 has an address interface which couples to address bus 12 and a data interface which couples to data bus 14. A communication channel additionally couples DMA controller 16 to host processor 11. This communications channel between host processor 11 and DMA controller 16 may consist of bus request, bus grant, and bus grant acknowledge signals. DMA controller 16 may be used to perform faster transfers of blocks of data than can occur through the use of host processor 11.

An input/output (I/O) circuit 18 has an address interface which couples to address bus 12 and a data interface which couples to data bus 14. Additionally, I/O circuit 18 has an input which couples to an analog-to-digital (A/D) converter 24, an output which couples to digital-to-analog (D/A) converter 26, and a digital input/output (I/O) channel. A/D 24, D/A 26 and the digital I/O channel provide communications between DSP 10 and an outside environment (not shown). DSP 10 may receive data from this outside environment through A/D 24 or the digital I/O channel. Such data may then be transferred to host memory 15. This transfer may be accomplished by direct memory access instigated when I/O circuit 18 communicates with DMA controller 16 through an interface therebetween. Alternatively, I/O circuit 18 may provide an interrupt (not shown) directly to host processor 11. Such an interrupt signals host processor 11 that new data is available or that an output device is free to accept new data.

Host processor 11 attempts to keep coprocessors 20 continually busy. Thus, host processor 11 contains computer software which partitions an overall digital signal processing job into a multiplicity of pipelined tasks. Furthermore, host processor 11 selects which ones of coprocessors 20 are to perform these partitioned tasks. Such selection of available ones of coprocessors 20 depends on an existing workload for each of coprocessors 20 at a given point in time.

Host processor 11 then queues the partitioned tasks with coprocessors 20. Host processor 11 also transfers data from host memory 15 to dual port memory elements 19 and arranges such data in arrays so that coprocessors 20 may perform the tasks assigned them. However, tasks are arranged to minimize transfers of blocks of data. Still further, host processor 11 maintains lists of portions or areas within dual port memory elements 19 which are currently being used by coprocessors 20 and of portions of dual port memory elements 19 which are free for use by host processor 11. Host processor 11 also performs signal processing and administrative functions. Control of gain for analog input and output data represents one of such additional signal processing functions.

When tasks have been allocated by host processor 11 to a particular coprocessor 20, and a particular data array set up within a corresponding dual port memory element 19, host processor 11 writes a command function block within the selected dual port memory element 19. This function block instructs the particular coprocessor 20 which function or algorithm to perform on data within the selected dual port memory element 19, and provides various parameters related to the data and the function. For example, such parameters may include the location within the selected dual port memory element 19 of the data array, the length of the data array, the location where results are to be stored, and sizes, taps, or lengths of loops for various filtering functions to be performed by coprocessor 20.

After the function block has been transferred to a dual port memory element 19, host processor 11 directly communicates with a corresponding coprocessor 20 thereby causing the coprocessor 20 to read the function block and perform the commanded function on the indicated data array within the dual port memory element 19.

Coprocessor 20a, coprocessor 20b, and coprocessor 20n may each operate on different tasks simultaneously. Thus, DSP apparatus 10 takes advantage of opportunities to conduct parallel processing. For example, one of coprocessors 20 may, at a given point in time, conduct an LPC encoding task while another one of coprocessors 20, at the same point in time, may conduct a decoding task. Alternatively, one of coprocessors 20 may conduct a task related to a first frame of data samples while coprocessors 20b and 20n operate on tasks related to second and third frames of digital samples. Those skilled in the art will recognize that many different tasks may be required in various DSP applications and that such tasks may be arranged in many different configurations.

When coprocessors 20 have finished execution of the functions as instructed by host processor 11, results are stored back in corresponding dual port memory elements 19 at locations defined by host processor 11. Then, a coprocessor 20 communicates directly with host processor 11 through assertion of an interrupt to inform host processor 11 that the function has been completed. Thus, dual port memory elements 19 serve the purpose of an intelligent blackboard or calculator to host processor 11. Data arrays are written into a dual port memory element 19, the corresponding coprocessor 20 is instructed which function to perform, and results from that function reappear to host processor 11 within the dual port memory element 19.

In the preferred embodiment, each of dual port memory elements 19 and corresponding coprocessors 20 represent identical channels. Although three channels are shown in FIG. 1, the preferred embodiment utilizes only channels a and b. However, any number of channels may be utilized in DSP 10 so long as the demands on host processor 11 do not exceed its ability to keep coprocessors 20 busy a large portion of the time.

Figure 2:
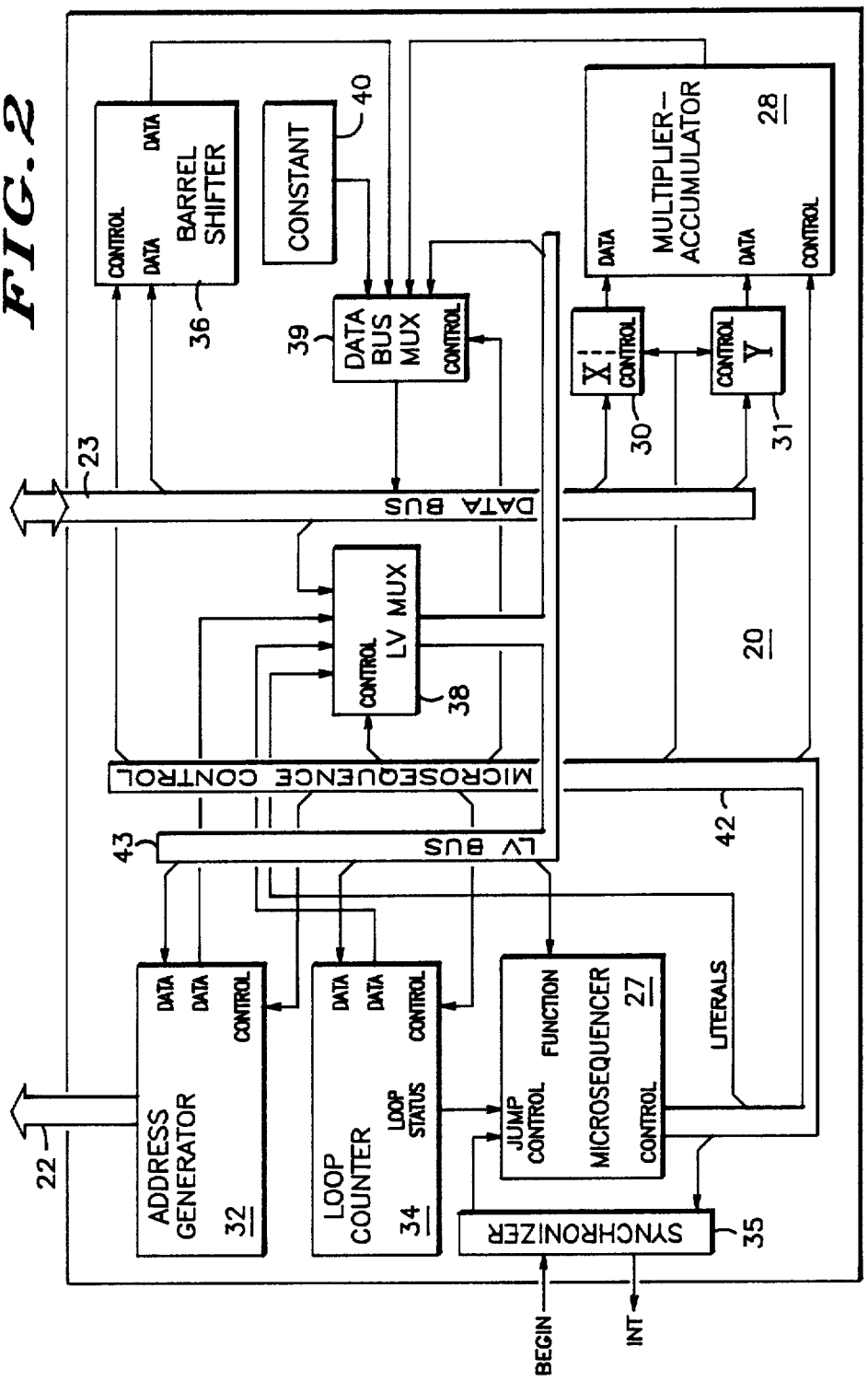
FIG. 2 shows a simplified block diagram of a coprocessor portion of the digital signal processing apparatus shown FIG. 1.

FIG. 2 shows a simplified block diagram of a coprocessor 20. Since coprocessors 20a, 20b and 20n shown in FIG. 1 represent identical coprocessors, FIG. 2 represents any one of coprocessors 20. Coprocessor 20 represents a microcontrolled or microcoded machine. As a microcontrolled machine, coprocessor 20 executes various sequences of micro-operations or microcycles to perform various tasks. The micro-operations performed by coprocessor 20 are similar in nature to instructions which are performed by a conventional microprocessor. Thus, coprocessor 20 has a microsequencer 27, which may also be referred to as a microcontroller or program controller. Microsequencer 27 provides an output in the form of a microsequencer control bus 42 which contains a multiplicity of digital bits. Each of these digital bits is capable of changing at the beginning of a micro-operation. However, these output bits remain at a constant state throughout a given micro-operation. The length of a micro-operation is designed to substantially equal the length of a memory access cycle for dual port memory element 19 (see FIG. 1). Thus, in the preferred embodiment a micro-operation exhibits approximately a 100 ns duration.

The output from microsequencer 27 serves the purpose of controlling the various functions contained within coprocessor 20. Thus, the output from microsequencer 27 couples to many items within coprocessor 20. Specifically, output bits from microsequencer 27 couple to an interrupt input of a synchronizer 35, a control input of a loop counter 34, a control input of an address generator 32, a control input of a last value (LV) multiplexer (mux) 38, a control input of a barrel shifter 36, a control input of a data bus multiplexer (mux) 39, a control input of an "X" data register 30, a control input of a "Y" data register 31, and a control input of a multiplier-accumulator 28.

Synchronizer 35 provides the interface between the direct communication link with host processor 11 (see FIG. 1) and coprocessor 20. Thus, interrupt signals and the begin signal also couple to synchronizer 35. Additionally, synchronizer 35 provides an output which couples to a jump control input of microsequencer 27.

Data bus 23 of coprocessor 20 couples to a data input of barrel shifter 36, a data input of data register 30, a data input of data register 31, a first data input of LV mux 38 and a data output of data bus mux 39. The data output from data register 30 couples to a first data input of multiplier-accumulator 28, and a data output of data register 31 couples to a second data input of multiplier-accumulator 28. An output of LV mux 38 drives a last value (LV) bus 43 which couples to a first data input of data bus mux 39, and data inputs of loop counter 34, and address generator 32. Additionally, LV bus 43 couples to a function input of microsequencer 27. A constant value generator 40 provides constant digital values such as 0, or positive and negative maximum values to a second data input of data bus mux 39. A data output of barrel shifter 36 couples to a third data input of data bus mux 39, and a data output of multiplier-accumulator 28 couples to a fourth data input of data bus mux 39.

Likewise, a literals portion of microsequence control bus 42 couples to a second data input of LV mux 38, a data output of loop counter 34 couples to a third input of LV mux 38, and a data output of address generator 32 couples to a fourth input of LV mux 38.

Accordingly, the FIG. 2 block diagram shows many data paths available within coprocessor 20. As examples, data may be routed from dual port memory element 19 (see FIG. 1) along data bus 23 to data registers 30 and 31, to barrel shifter 36, or LV mux 38. From LV mux 38, data from dual port memory element 19 can be routed to microsequencer 27, loop counter 34, or address generator 32. Additionally, data from multiplier-accumulator 28 may be routed through data bus mux 39 to data bus 23 and stored in dual port memory element 19. Or, data can be routed from barrel shifter 36 through data bus mux 39 to dual port memory element 19. Still further, data may be routed from barrel shifter 36 through data bus mux 39 to multiplier-accumulator 28, or from multiplier-accumulator 28 through data bus mux 39 to barrel shifter 36. Likewise, literals from microsequencer 27 may be routed through LV mux 38 into address generator 32 or loop counter 34, or on to data bus 23 and the devices which connect thereto. All such rooting of data occurs under the control of microsequencer 27, which is programmable through microcode.

Consequently, coprocessor 20 provides a wide variety of data paths to support a wide variety of digital signal processing applications. In a typical digital signal processing task, host processor 11 (see FIG. 1) establishes a function block of data in dual port memory element 19. This function block resides at a location in dual port memory element 19 which is determined by host processor 11. A predetermined location in dual port memory element 19 would then contain a vector or pointer to the address of the function block. In the preferred embodiment, this predetermined address is address 0.

Next, host processor 11 asserts a begin signal which couples through synchronizer 35 and causes microsequencer 27 to exit an idle state and thereby cause address generator 32 to output the above-mentioned predetermined address, which is 0 in the preferred embodiment. Data from this predetermined address then becomes available on data bus 23 in the subsequent micro-operation and is latched into LV mux 38. In a subsequent micro-operation, this data moves from LV mux 38 into address generator 32. Next, address generator 32 outputs this same data as an address to dual port memory element 19 on data address bus 22.

Another read operation is performed from dual port memory element 19 and this next data is moved onto data bus 23, through LV mux 38, and into the function input of microsequencer 27 where it is stored. This function data serves as a vector to a location of microcode which defines a sequence of micro-operations that will cause the specified function to be executed by coprocessor 20. Next, microsequencer 27 causes coprocessor 20 to read remaining portions of the function block from dual port memory element 19. The remaining portions of the function block are routed along data bus 23 through LV multiplexer 38 into storage registers within address generator 32 and loop counter 34. At this point, address generator 32 contains addresses of data arrays upon which coprocessor 20 will operate while executing the specified function.

Likewise, loop counter 34 contains information related to inner loop and outer loop lengths for the specified function. Those skilled in the art will recognize that conventional digital processing algorithms require a large number of multiply-accumulate operations within inner loops of the algorithms. This multiply-accumulate operation is performed in multiplier-accumulator 28 of coprocessor 20.

For a typical sequence of micro-operations, coprocessor 20 reads a first element of a data array from dual port memory element 19 in a first micro-operation, and stores this first element of data into data register 30. In the preferred embodiment, data register 30 represents a two-stage register. During this first micro-operation, the first element of data is loaded only into the first stage of data register 30. During a second micro-operation, a second data element is read from dual port memory element 19 into data register 31, and the first data element is transferred from the first stage to the second stage of data register 30. Thus, at the beginning of a third micro-operation, the first and second data elements are presented at the outputs of data registers 30 and 31, respectively. During this third and a fourth micro-operation, multiplier-accumulator 28 operates upon the first and second elements while third and fourth data elements are being loaded into data registers 30 and 31. At the end of the fourth micro-operation, the results from the multiply-accumulate operation are available at the output of multiply-accumulator 28. These results may be routed back to data bus 23 or utilized in subsequent multiply-accumulate operations.

Thus, coprocessor 20 represents a pipelined machine. Data which is fetched in one micro-operation is operated upon in a subsequent micro-operation by multiplier accumulator 28. Multiplier-accumulator 28 operates a large percentage of the time because it need not wait on data being fetched from dual port memory element 19. Rather, data becomes immediately available at the outputs of data registers 30 and 31 at the beginning of micro-operations in which multiplier-accumulator receives new data. Additionally, coprocessor 20 utilizes only a single data bus, a single memory element and a single address generator. As a result, hardware requirements are simplified because multiple memory elements and multiple address generators are not required.

Figure 3:
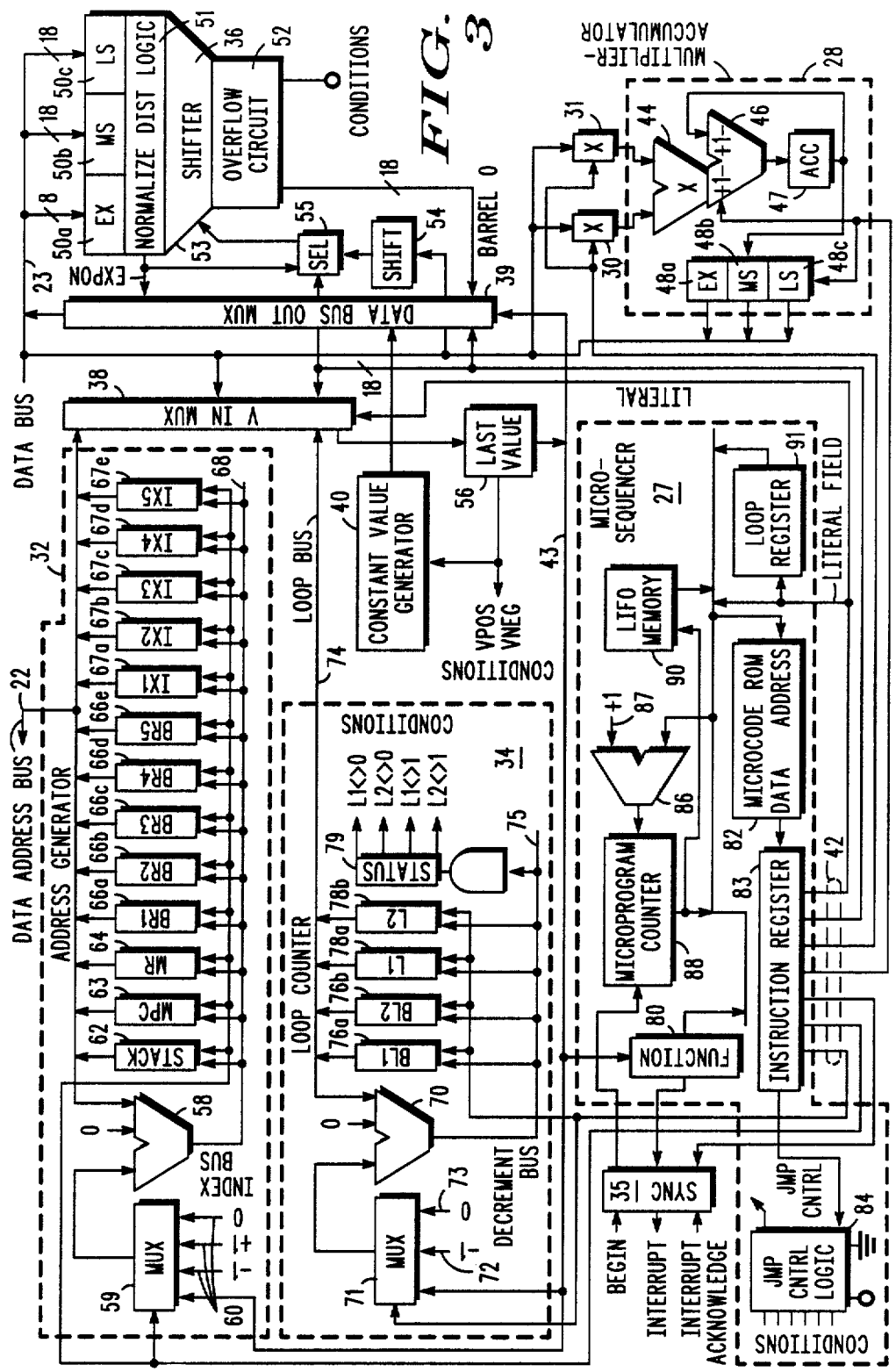
FIG. 3 shows a more detailed block diagram of the subject matter shown in FIG. 2.

FIG. 3 shows a more detailed block diagram of coprocessor 20 than is shown by FIG. 2. Specifically, last value (LV) bus 43 couples to an input of a function register 80 within microsequencer 27. An output of function register 80 couples to an address input of a microcode ROM 82. Microcode ROM 82 contains data which represents the microcode or program that controls coprocessor 20. An output from microcode ROM 82 couples to an input of an instruction register 83. An output from instruction register 83 provides microsequencer control bus 42. A literal field of control bus 42 couples back to the address input of microcode ROM 82 and to an input of a loop register 91. An output of loop register 91 also couples back to the address input of microcode ROM 82. A microprogram counter 88 has an output which couples to an input of a last in, first out (LIFO) memory 90, a first input of an arithmetic unit 86, and the address input of microcode ROM 82. A set of terminals 87, which are adapted to provide a logical 1 value, couples to a second input of arithmetic unit 86, and an output of arithmetic unit 86 couples to an input of microprogram counter 88.

A portion of microsequencer control bus 42 also couples internally to microsequencer 27 to a jump control logic multiplexer (mux) 84. An output of jump control logic mux 84 couples to the address input of microcode ROM 82. Inputs to jump control logic multiplexer 84 come from status indicators located throughout coprocessor 20. For example, one status indicator couples to a ground or logical 0 value while another status indicator couples to a logical 1 value. These status indicators cause micro-operations to perform a no jump, or an unconditional jump situation when selected by the microcode. The remaining status indicators allow micro-operations to perform conditional jumps within the microcode.

Instruction register 83 may include various decoders and independent registers so that the number of bits output from microcode ROM 82 may be minimized and the number of bits contained in microsequencer control bus 42 may be greater than the number of bits output from microcode ROM 82. As discussed above, a function number provided by host processor 11 (see FIG. 1) may enter microsequencer 27 through LV bus 43. This function number is stored in function register 80. Thus, this value provides an address to microcode ROM 82. Additionally, a bit 15 of function register 80 couples to an input of synchronizer 35. This bit, which is either set or reset by host processor 11, informs coprocessor 20 when to interrupt host processor 11 at the completion of the specified function. When this bit is reset, coprocessor 20 may continue execution of additional functions until the complete set of functions specified by host processor 11 has been completed or host processor 11 fails to acknowledge a previously asserted interrupt prior to assertion of a second interrupt by coprocessor 20.

LIFO memory 90 allows microcode contained within microcode ROM 82 to be executed using subroutines, and ALU 86 in connection with microprogram counter 88 permit microcode execution to sequence through successive locations of microcode. Loop register 91 is included so that extra micro-operations are not required while coprocessor 20 performs commonly used looping routines. Through the use of loop register 91, inner loops of digital signal processing algorithms may be executed as fast as possible.

In FIG. 3, the output of LV mux 38 is shown coupled to a data input of a last value register 56. An output of last value register 56 drives LV bus 43. Additionally, last value register 56 provides sign (positive or negative) status indicators to jump control logic multiplexer 84 of microsequencer 27.

Loop counter 34 includes a multiplexer 71 which has a first input that couples to LV bus 43. A second input of multiplexer 71 couples to a set of terminals 72 which provide a −1 value, and a third input of multiplexer 71 couples to a set of terminals 73 which provide a 0 digital value. The control input of multiplexer 71 couples to microsequencer control bus 42, and an output from multiplexer 71 couples to a first input of an arithmetic unit 70. A second input of arithmetic unit 70 couples to a digital device which selectively provides a logical 0 value and to outputs of a base loop register 76a, a base loop register 76b, a loop register 78a, and a loop register 78b. The outputs of registers 76 and 78 provide the data output from loop counter 34 designated as a loop bus 74. An output of arithmetic unit 70 drives a decrement bus 75 that couples to inputs of base loop register 76a, base loop register 76b, loop register 78a, and loop register 78b. Additionally, decrement bus 75 couples to status logic 79, which provides status indicators that couple to jump control logic mux 84 of microsequencer 27. Additionally, portions of microsequencer control bus 42 couple to control inputs, such as clock inputs, of registers 76 and 78.

Registers 76 and 78 are structurally identical. However, in operation, registers 76 typically act as base registers and registers 78 typically act as counters. Values are typically loaded into a base loop register 76 from dual port memory element 19 as defined by host processor 11 (see FIG. 1). During initializing micro-operations of a specified function, data relating to inner loop length and outer loop length of the specified digital signal processing algorithm is routed onto LV bus 43 and through mux 71 to the first input of arithmetic unit 70. Simultaneously, a digital 0 value is applied at the second input of arithmetic unit 70. The result output from arithmetic unit 70 is then routed to a base loop register 76 and stored under control of microsequencer 27. During the digital signal processing algorithm, data within base loop registers 76 are typically loaded into loop registers 78 when needed, and loop registers 78 are then decremented through the application of a −1 digital value at the first input of arithmetic unit 70, and the result stored back in the originating register 78.

Status logic 79 detects when decrement bus 75 contains data representing a 0 value or a 1 value. Such conditions indicate the end or near end, respectively, of an inner loop or an outer loop. These status indicator conditions couple back to microsequencer 27 causing microcode 82 to know when a loop is completed. The use of hardware loop counters maximizes processing of speed commonly used programming loops.

Address generator 32 operates in a manner similar to that described above for loop counter 34. Specifically, LV bus 43 couples to a first input of a multiplexer 59. Terminals 60 which supply a −1, +1, and 0 digital values, couple to second, third, and fourth inputs, respectively, of multiplexer 59. An output of multiplexer 59 couples to a first input of an arithmetic unit 58. An output of arithmetic unit 58 drives an index bus 68 which couples to inputs of a stack register 62, a microprogram counter register 63, a memory relative register 64, base registers 66a, 66b, 66c, 66d, and 66e, and index registers 67a, 67b, 67c, 67d and 67e. Outputs from stack register 62, microprogram counter 63, memory relative register 64, base registers 66, and index registers 67 drive data address bus 22 and couple to a second input of arithmetic unit 58. However, those skilled in the art will recognize that only one of registers 62–67 may drive data address bus 22 during any one micro-operation. Data address bus 22 forms the data output from data address generator 32. Additionally, the second input of arithmetic unit 58 is adapted to selectively receive a logical 0 value. Thus, data may be routed into any of registers 62 through 67 from LV bus 43 through multiplexer 59, and arithmetic unit 58. Portions of microsequencer control bus 42 couple to control inputs of multiplexer 59 and registers 62 through 67. Values stored within registers 62 through 67 may be incremented, decremented, or not changed by enabling an appropriate one of registers 62 through 67 to drive data address bus 22, and simultaneously selecting appropriate inputs to multiplexer 59 from microsequencer 27. The results on index bus 68 are then stored in the originating one of registers 62–67.

In the preferred embodiment, registers 62 through 67 are structurally identical. A sufficient number of registers are provided for pointing at two input sequences, such as state variables and coefficients, and one output sequence. Base registers 66 are typically used to store initial values of input and output data arrays, memory relative register 64 is typically used to provide a table lookup capability, and stack register 62 provides a stack pointer capability. Stack register 62 may be incremented as data is pushed on a stack and decremented as data is removed from a stack. Microcode program counter 63 typically contains an address of a location in dual port memory element 19 (see FIG. 1) of a function block or a word within the block. Microprogram counter register 63 may be incremented as microsequencer 27 inputs data from function blocks. Memory relative register 64 may be loaded with data which is used as an address during table lookup operations, and base registers 66 may typically be loaded with data which represents addresses of data arrays for input and output data. Index registers 67 are typically loaded from base registers 66 and then incremented or decremented to address particular elements of various data arrays.

In the present invention, an address for dual port memory element 19 (see FIG. 1) is immediately available at the beginning of a micro-operation. Thus, time is saved in accessing dual port memory element 19 compared to DSP systems which require a significant amount of time for addresses on a data address bus to become stable. Resultingly, address generator 32 represents an improvement over digital signal processing systems which increment or decrement addresses in the same micro-operations that the resulting incremented or decremented addresses are needed for memory accesses.

FIG. 3 shows a data output of data register 30 coupling to a first input of a multiplier 44 within multiplier-accumulator 28 and a data output of data register 31 coupling to a second input of multiplier 44. An output of multiplier 44 couples to a first input of a summing device 46, and an output of summing device 46 couples to an input of an accumulator register 47. An output of accumulator register 47 couples to an output data register 48, and to a second input of summing device 46.

Summing device 46 may invert signals applied at either the first or second inputs thereof under control of a portion of the bits from microsequencer control bus 42. Thus, microsequencer 27 controls the type of multiply-accumulate operation being performed. In the preferred embodiment, data bus 23 represents a 16-bit bus and data registers 30 and 31 each store 16-bit values. A full precision multiply-operation of two 16-bit values produces a 32-bit output. Summing operations, which include addition and subtraction operations, over several 32-bit numbers increase the number of bits needed to fully describe the results of the summing operation. In the preferred embodiment, accumulator register 17 and output data register 48 each accommodates 40 bits. Thus, multiplier-accumulator 28 can perform multiply-accumulate operations on up to 255 samples of 16-bit data pairs without loss in precision.

Since data bus 23 is a 16-bit bus, the 40-bit output from multiplier-accumulator 28 is partitioned into three words for presentation to data bus 23. Thus, register 48 includes a least significant register 48c, a most significant register 48b and an extension register 48a. Registers 48a, 48b, and 48c may be used to output the 40-bit value from multiplier-accumulator 28 onto data bus 23 in three separate micro-operations. Similarly, barrel shifter 36 inputs a 40-bit value from data bus 23. Thus, an input register 50 of barrel shifter 36 is partitioned into a least significant input register 50c, a most significant input register 50b and an extension register 50a. Alternatively, the present invention optionally supports a portion of data bus 23 being a 40-bit bus between multiplier-accumulator 28 and barrel shifter 36. This 40-bit portion permits the transfer of data from multiplier-accumulator 28 to barrel shifter 36 in a single micro-operation rather than in the three micro-operations required by a 16-bit data bus.

Input register 50 of barrel shifter 36 couples to a normalization distance logic circuit 51 and to a shifter 53. Shifter 53 performs a conventional barrel shift function, which requires approximately one micro-operation to complete, and outputs a 40-bit value to a shifter overflow circuit 52. In the present invention, the term barrel shifter applies to shifters which perform arithmetic shifts whether or not such shifters additionally perform rotational shifts. An output of shifter overflow circuit 52 couples to the third input of data bus mux 39. An output of normalization distance logic 51 also couples to an input of data bus mux 39 and to a first input of a selection multiplexer 55. An input of a shift distance register 54 also couples to data bus 23, and an output of shift distance register 54 couples to a second input of selection multiplexer 55. A control input of selection multiplexer 55 couples to microsequence control bus 42, and an output of selection multiplexer 55 couples to shifter 53.

In the preferred embodiment, barrel shifter 36 operates in two modes. In a normalization mode, a 40-bit input word stored in input register 50 is examined by normalization distance logic 51 to determine a shift distance which will cause the word to be normalized. Those skilled in the art of twos complement arithmetic will recognize that this normalization distance logic performs its function by determining the most significant location in the 40-bit word where adjacent bits differ in value. Then, the difference between this bit position and the number 40, which represents the number of bits in the word, represents the shift distance required to normalize the digital word. In the normalized mode of operation, this shift distance represents an exponent and is routed through selection multiplexer 55 back to shifter 53 so that a barrel shift of this normalization distance may occur.

In a straight shift mode of operation, a data value is loaded into shift distance register 54 from data bus 23. This data value may originate from dual port memory element 19, or the literal field of microsequencer control bus 42. This shift value is routed through selection multiplexer 55 to shifter 53 so that a barrel shift of this distance may occur. The control input of selection multiplexer 55, which is influenced by microsequencer 27, determines the mode in which barrel shifter 36 operates.

In the present invention, barrel shifter 36 detects two error conditions. One error condition represents an overflow which may occur in the straight shift mode of operation. An overflow occurs when a shift distance is specified which, if executed on a data word stored in register 50, would cause the data word to overflow. Accordingly, overflow control logic 52 detects this situation and causes the output to autosaturate, or exhibit a maximum positive or negative value. Another error condition occurs in the normalization mode when a data value of 0 exists in input register 50. In this situation, data output from normalization distance logic 51 to data bus multiplexer 59 may be in error. When this condition occurs, a condition status indicator, which couples to jump control logic multiplexer 84 of microsequencer 27, is set.

Those skilled in the art will recognize that coprocessor 20 as described above contains sufficient capabilities to perform a wide variety of digital signal processing applications. Specifically, coprocessor 20 and microcode ROM 82 contained therein may be programmed to perform Infinite Impulse Response (IIR), Finite Impulse Response (FIR), One Stage Block Inverse, and Boxcar Averaging Filters. Additionally, coprocessor 20 may be coded to perform various correlation functions such as Auto or Cross Correlation, Absolute Magnitude Differencing, Parcor Numerator and Denominator correlations, and Burg Cross Correlations. Furthermore, a wide variety of vector and scaler processes such as adds, subtracts, multiplies, divides, normalize, shifts, reverse ordering, table lookups, up samples, down samples, and finding maximum and minimum values may be implemented. Still further, a set of execution control algorithms such as incrementing and decrementing a list of locations, looping, linking lists together, and performing jumps and conditional jumps may be performed using coprocessor 20.

As an example of programming microcode ROM 82 in microsequencer 27, for a Finite Impulse Response filter, one of index registers 67 in address generator 3 points to the input sequence, another of index registers 67 points to tap coefficients, and a third one of index registers 67 points to the results data array. An inner loop counter is established in a first one of loop counter registers 78 of loop counter 34, and an outer loop counter is established in the second one of loop counter registers 78. In the inner loop, where the result is computed, the first index register and the second index register are each incremented as the Finite Impulse Response sequence of multiply-accumulates is performed.

After storing the first result, the results pointer index register is incremented. To prepare to compute the second output sample, the tap coefficient register is reset to an original value, and the input excitation index register is reset to its original value +1. Thus, in this manner the filter moves through the input data until the FIR function is completed.

In summary, the present invention provides an integrated digital signal processing design which encompasses computationally efficient multiply-accumulate operations in the innermost portions of loops performed by digital signal processing algorithms, and an efficient transfer of data to and from arrays by a host processor in a parallel programming environment. Furthermore, host processor 11 (see FIG. 1) utilizes higher level instructions to communicate with coprocessors 20, and coprocessors 20 are capable of performing a wide variety of digital signal processing algorithms efficiently.

The present invention is described above with reference to a particular preferred embodiment which facilitates teaching the invention. However, those skilled in the art will recognize that many alternative embodiments also fall within the scope of the present invention and that the block diagrams described herein describe the present invention in simplified terms to promote understanding of the present invention. Thus, many changes and modifications to the preferred embodiment described above are intended to be included within the scope of the present invention. For example, those skilled in the art will recognize that coprocessor 20 must accommodate provisions for initialization of various registers and states within coprocessor 20 upon a power-on condition. Additionally, many modifications such as the routing of the data output from multiplier-accumulator 28 directly to data bus 23 as shown in FIG. 3 or through data bus mux 39 as shown in FIG. 2 does not affect the scope of the present invention. Still further, those skilled in the art will recognize that various logic elements, decoders, and the like may be required for interfacing microsequencer control bus 42 to the various registers and multiplexers with proper timing considerations.

We claim:

1. A digital signal processing apparatus comprising:
    a host processor having a data bus and an address bus;
    first and second dual port memory elements, wherein each of said memory elements has first and second data and address interfaces, said first data interfaces of said first and second memory elements being coupled to said host processor data bus, and said first address interfaces of said first and second memory elements being coupled to said host processor address bus; and
    first and second coprocessors each being for performing predetermined arithmetic functions required by digital signal processing applications, and each having a data bus and a data address bus, said first coprocessor data bus being coupled to said first memory element second data interface, said first coprocessor data address bus being coupled to said first memory element second address interface, said second coprocessor data bus being coupled to said second memory element second data interface, and said second coprocessor data address bus being coupled to said second memory element second address interface.

2. An apparatus as claimed in claim 1 wherein said first coprocessor comprises:
    a first data register having an input coupled to said first coprocessor data bus and an output;
    a second data register having an input coupled to said first coprocessor data bus and an output; and
    a multiplier-accumulator having a first input coupled to said first data register output and a second input coupled to said second data register output.

3. An apparatus as claimed in claim 2 wherein said first coprocessor comprises:
    a microsequencer having an output coupled to said first and second data registers, said microsequencer being for controlling a sequence of coprocessor micro-operations so that a predetermined digital signal processing function may be performed on data contained within said first dual port memory; and
    an address generator having an input coupled to said microsequencer output and an output coupled to said first coprocessor data address bus, said address generator being for generating an address of a data word within said first dual port memory during a first micro-operation, whereafter said microsequencer causes said multiplier-accumulator to operate upon the data word during a second micro-operation which occurs after the first micro-operation.

4. An apparatus as claimed in claim 3 wherein said address generator comprises:
    an arithmetic unit having a first input coupled to said first coprocessor data address bus, a second input, and a output;
    means for generating at least one constant digital value, said generating means having a control input coupled to said microsequencer output and an output coupled to said arithmetic unit second input; and
    a plurality of registers each having a first input coupled to said arithmetic unit output, a control input coupled to said microsequencer output, and an output coupled to said first coprocessor data address bus.

5. An apparatus as claimed in claim 4 wherein said address generator additionally comprises means for transferring data between said first coprocessor data bus and said first coprocessor data address bus, said transferring means having an input coupled to said first coprocessor data bus, a control input coupled to said microsequencer output, and an output coupled to said first coprocessor data address bus.

6. An apparatus as claimed in claim 3 wherein said host processor has an interrupt input and a programmable output bit output, and said first coprocessor comprises means for synchronizing operation of said microsequencer with operation of said host processor, said synchronizing means having an input coupled to said host processor programmable output bit and an output coupled to said host processor interrupt input.

7. An apparatus as claimed in claim 3 wherein said microsequencer has a jump control input, and said first coprocessor additionally comprises a loop counter having an input coupled to said microsequencer output and an output coupled to microsequencer jump control input.

8. An apparatus as claimed in claim 7 wherein said loop counter comprises:
    an arithmetic unit having first and second inputs and an output;

means for generating at least one constant value, said generating means having a control input coupled to said microsequencer output and an output coupled to said arithmetic unit first input; and a plurality of registers each having a data input coupled to said arithmetic unit output, a control input coupled to said microsequencer third output, and an output coupled to said arithmetic unit second input.

9. An apparatus as claimed in claim 8 wherein said loop counter additionally comprises means for transferring data between said first coprocessor data bus and said arithmetic unit first input, said transferring means having an input coupled to said first coprocessor data bus, a control input coupled to said microsequencer output, and an output coupled to said arithmetic unit first input.

10. An apparatus as claimed in claim 3 additionally comprising a barrel shifter having a data input coupled to said first coprocessor data bus, a control input coupled to said microsequencer control output, and a shift output coupled to said first coprocessor data address bus.

11. An apparatus as claimed in claim 10 additionally comprising means for operating in a one of a normalizing mode and a straight shifting mode, said operating means having a data input coupled to said first coprocessor data bus, a control input coupled to said microsequencer output, and an output coupled to said barrel shifter control input.

12. A method of processing first and second portions of digital representations of analog signals, said method comprising the steps of:

making the first and second portions available to a host processor;

transferring the first portion from the host processor through a first port of a first dual port memory to the first dual port memory;

transferring the second portion from the host processor through a first port of a second dual port memory to the second dual port memory;

operating on the first portion using a first coprocessor which couples to a second port of the first dual port memory; and operating on the second portion using a second coprocessor which couples to a second port of the second dual port memory.

13. A method as claimed in claim 12 wherein said operating on the first portion comprises the steps of:

moving a first data word from the first portion in the first dual port memory to a first data register in a first micro-operation;

moving a second data word from the first portion in the first dual port memory to a second data register in a second micro-operation; and performing a multiply-accumulate operation on the data words in the first and second data registers during third and fourth micro-operations, wherein the first, second, third, and forth micro-operations, respectively, represent successively adjacent micro-operations.

14. A method as claimed in claim 13 additionally comprising the step of storing results from said operating on the first portion step in the first dual port memory.

15. A digital signal processing apparatus comprising:

a host processor having a data bus and an address bus;

first and second dual port memory elements, wherein each of said memory elements has first and second data and address interfaces, said first data interfaces of said first and second memory elements being coupled to said host processor data bus, and said first address interfaces of said first and second memory elements being coupled to said host processor address bus;

first and second coprocessors wherein:

each of said coprocessors has a data bus and a data address bus, said first coprocessor data bus being coupled to said first memory element second data interface, said first coprocessor data address bus being coupled to said first memory element second address interface, said second coprocessor data bus being coupled to said second memory element second data interface, and said second coprocessor data address bus being coupled to said second memory element second address interface; and said first coprocessor comprises:

a first data register having an input coupled to said first coprocessor data bus and an output;

a second data register having an input coupled to said first coprocessor data bus and an output;

a multiplier-accumulator having a first input coupled to said first data register output and a second input coupled to said second data register output;

a microsequencer having an output coupled to said first and second data registers and having a jump control input ;

an address generator having an input coupled to said microsequencer output and an output coupled to said first coprocessor data address bus;

a loop counter having an input coupled to said microsequencer output and an output coupled to microsequencer jump control input; and a barrel shifter having a data input coupled to said first coprocessor data bus, a control input coupled to said microsequencer control output, and a shift output coupled to said first coprocessor data bus.

* * * * *